April 28, 1970     G. E. SCHEITLIN ET AL     3,508,815

SAFETY REARVIEW MIRROR

Filed Sept. 25, 1967

INVENTORS
GEORGE E. SCHEITLIN
WILLIAM W. JULBERT
BY

*Trask, Jenkins & Hanley*

ATTORNEYS

United States Patent Office 3,508,815
Patented Apr. 28, 1970

3,508,815
SAFETY REARVIEW MIRROR
George E. Scheitlin and William W. Julbert, Columbus, Ind., assignors to Arvin Industries, Inc., Columbus, Ind., a corporation of Indiana
Filed Sept. 25, 1967, Ser. No. 670,214
Int. Cl. G02b 5/08; A47g 1/17
U.S. Cl. 350—288                                          1 Claim

ABSTRACT OF THE DISCLOSURE

A safety rearview mirror includes a resilient casing of thermoplastic foam having a thin flexible thermoplastic skin bonded to its outer surface. The casing extends around the periphery of a reflector element and partially encapsulates a supporting structure. In one form, the reflector element is bonded directly to the casing which in turn is bonded directly to the supporting structure. In another form, the inner surface of the casing is also covered by a thin flexible thermoplastic skin which is bonded to the casing. A web of said skin extends between and is bonded to the reflecting element and supporting structure.

SUMMARY OF THE INVENTION

In accordance with one form of the invention, there is provided a mirror having a reflective surface operatively connected to a supporting structure for mounting said mirror on an automotive vehicle. A resilient foam casing extends substantially completely over said supporting structure and around the periphery of said mirror and has a flexible skin extending over its outer surface and bonded thereto. Said skin covered casing provides a light weight resilient housing for the mirror assembly which, because of its light weight, will reduce the tendency of the assembly to vibrate out of the desired position of adjustment, and which, because of its resiliency, will provide the assembly with a cushioned exterior for safety.

DESCRIPTION OF THE DRAWINGS

The accompanying drawings illustrate the invention. In such drawings.

DETAILED DESCRIPTION

Figure 1:
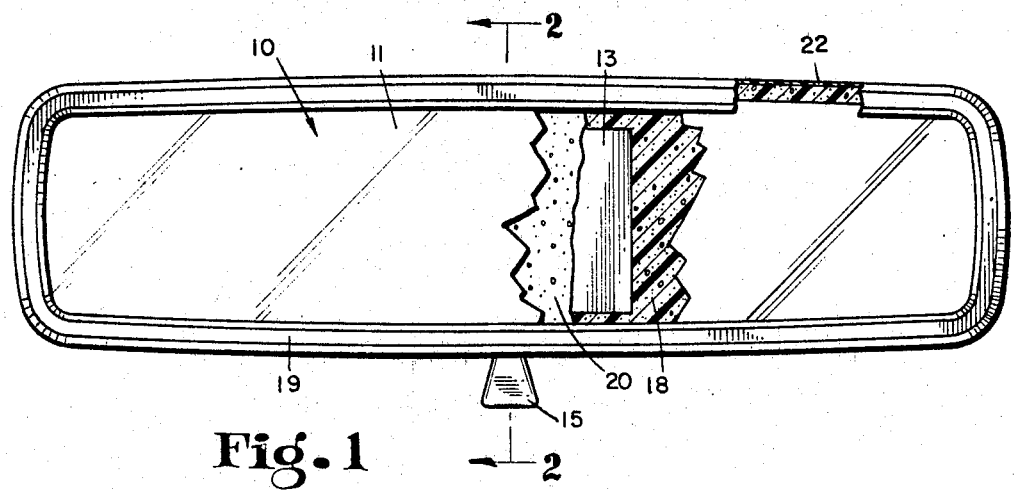
FIG. 1 is a rear elevation of a rear view mirror embodying the invention, but with portions thereof being broken away.

The invention is illustrated in the drawings as being employed in combination with an adjustable rear view mirror assembly such as is disclosed in copending application Ser. No. 587,164, filed Oct. 17, 1966, now Patent No. 3,427,094.

As shown, the mirror 10 which has a pair of reflective surfaces 11 and 12, is operatively interconnected to a supporting structure mounted in a shell 13. Said supporting structure has a forwardly projecting mounting stud 14 and an adjustment lever 15 for actuating the supporting structure to dispose the desired one of the surfaces 11 and 12 in position to reflect an image back to the driver. The details of said supporting structure are described in our aforesaid Patent No. 3,427,094, but it is to be understood that said structure forms no part of the instant invention, and any desired supporting structure can be employed.

Figures 2, 3:
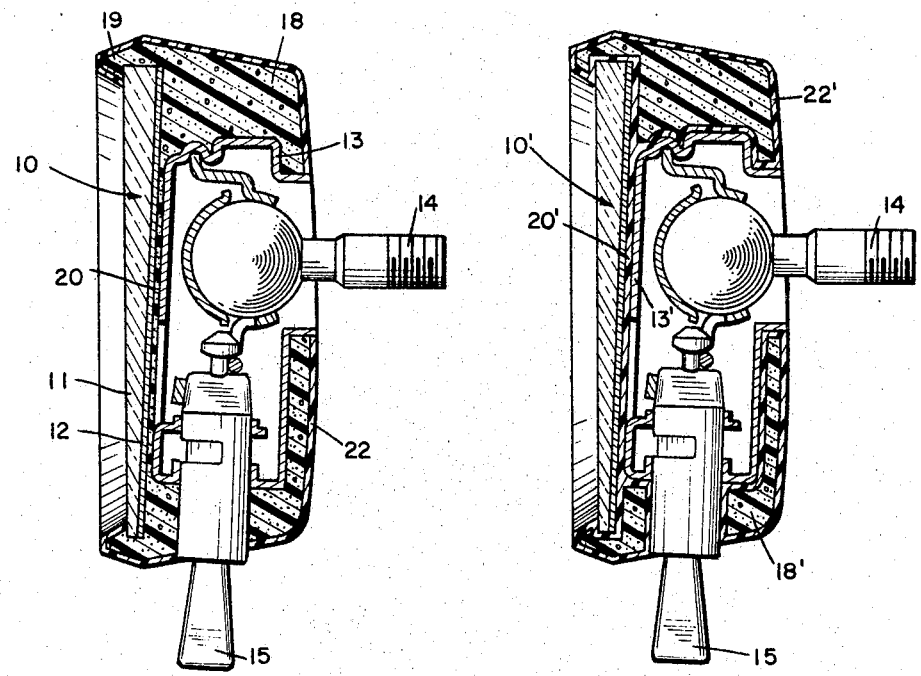
FIG. 2 is a vertical section taken on the line 2—2 of FIG. 1.
FIG. 3 is a vertical section smiliar to FIG. 2, but showing a modified form of the invention.

In the embodiment shown in FIG. 2, the assembly is carried in a casing 18 formed from a foamed thermoplastic material such as polyvinyl chloride, polyurethane, or the like. The casing foam contains from 0.25 to 3.0 times as much air as plastic to give it the desired resiliency and weight. The casing is bonded to the mirror 10 and shell 13 but is provided with openings for the outwardly projecting stud 14 and lever 15. As shown, the casing extends over the outer edges of the mirror and around the mirror margins to provide a rearwardly projecting cushioned frame 19 around the reflective surface 11 of said mirror. In the embodiment shown in FIG. 2, a thin web 20 of the casing extends between and is bonded to the adjacent faces of the mirror 10 and shell 13. The inherent resiliency of the casing frame 19 protects a driver or other occupant in an automotive vehicle from striking any sharp surfaces of the assembly, and the web 20 and casing 18 prevent the mirror 10 from shattering on impact.

A flexible skin 22 formed from a thermoplastic material such as polyvinyl chloride or the like extends over and is bonded to the casing 18. Said skin has a thickness of from 10–30 mils to give it sufficient strength to protect the casing foam without destroying the effective resiliency of the casing. The casing and skin provide the assembly with a housing of substantially lighter weight than conventional solid plastic and metal housed mirrors to thus reduce the tendency of the assembly to vibrate out of the desired position of adjustment.

The embodiment shown in FIG. 3 is like the embodiment shown in FIG. 2 with the exception that in addition to the skin 22' being bonded to the outer surface of the casing 18' and back of mirror 10', it is also interposed between and bonded to the mirror 10' and shell 13' and the inner surface of the casing for mounting the casing on said mirror and shell. With the skin being interposed between the casing and the mirror and shell, the web 20' between said mirror and shell is thus formed by the skin instead of the casing foam. As with the foam web 20 and casing 18 shown in FIG. 2, the web 20' and skin 22', being bonded to the mirror, prevent said mirror from shattering.

While our invention has been illustrated as being used with a prismatic mirror and adjustable supporting structure, it is to be understood, of course, that it can be employed with any desired type of mirror and supporting structure.

We claim:

1. In a rear view mirror assembly, a mirror having at least one reflective surface, a supporting structure operatively interconnected to said mirror for supporting it in operative position, a resilient casing of a thermoplastic foam material containing from 0.25 to 3.0 as much air as thermoplastic material and partially encapsulating said supporting structure and extending around the periphery of said reflective surface, and a flexible skin of thermoplastic material having a thickness of from 10 to 30 mils extending over the outer surface of said casing and interposed between casing and mirror and supporting structure, said skin being bonded to the outer surface of said casing and to the adjacent faces of said casing, mirror and supporting structure, with a web of skin extending between and bonded to adjacent surfaces of the mirror back and supporting structure.

References Cited

UNITED STATES PATENTS

| | | | |
|---|---|---|---|
| 3,383,152 | 5/1968 | Ward | 350—288 X |
| 3,391,895 | 7/1968 | Bausch et al. | |
| 3,427,095 | 2/1969 | Dykema et al. | 350—288 X |
| 3,427,096 | 2/1969 | Dykema et al. | 350—288 X |

FOREIGN PATENTS 749,669  1/1967  Canada.

DAVID SCHONBERG, Primary Examiner

J. W. LEONARD, Assistant Examiner

U.S. Cl. X.R.

248—467, 481; 350—67, 281